(12) United States Patent
Miller et al.

(10) Patent No.: US 12,154,547 B2
(45) Date of Patent: Nov. 26, 2024

(54) MULTI-CHANNEL VOICE ACTIVITY DETECTION

(71) Applicant: Google LLC, Mountain View, CA (US)

(72) Inventors: Nolan Andrew Miller, Seattle, WA (US); Ramin Mehran, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/471,627

(22) Filed: Sep. 21, 2023

(65) Prior Publication Data

US 2024/0013772 A1 Jan. 11, 2024

Related U.S. Application Data

(63) Continuation of application No. 17/806,198, filed on Jun. 9, 2022, now Pat. No. 11,790,888, which is a (Continued)

(51) Int. Cl.
G10L 15/02 (2006.01)
H04R 3/00 (2006.01)

(52) U.S. Cl.
CPC ............. *G10L 15/02* (2013.01); *H04R 3/005* (2013.01)

(58) Field of Classification Search
CPC ..... G10L 15/02; G10L 25/78; G10L 21/0216; G10L 15/16; G10L 25/51; G10L 2021/02166; H04R 3/005
See application file for complete search history.

(56) References Cited

U.S. PATENT DOCUMENTS

2015/0221322 A1* 8/2015 Iyengar .................. G10L 25/84
704/226
2015/0289064 A1 10/2015 Jensen et al.
(Continued)

FOREIGN PATENT DOCUMENTS

WO WO-2021145873 A1 * 7/2021 ............... G06N 3/08

OTHER PUBLICATIONS

Junzhao et al., "Catch You as I Can: Indoor Localization via Ambient Sound Signature and Human Behavior", Nov. 26, 2013 https://journals.sagepub.com/doi/full/10.1155/2013/434301 (Year: 2013).*
(Continued)

*Primary Examiner* — Yogeshkumar Patel
(74) *Attorney, Agent, or Firm* — Honigman LLP; Brett A. Krueger; Grant Griffith

(57) ABSTRACT

A method for multi-channel voice activity detection includes receiving a sequence of input frames characterizing streaming multi-channel audio captured by an array of microphones. Each channel of the streaming multi-channel audio includes respective audio features captured by a separate dedicated microphone. The method also includes determining, using a location fingerprint model, a location fingerprint indicating a location of a source of the multi-channel audio relative to the user device based on the respective audio features of each channel of the multi-channel audio. The method also includes generating an output from an application-specific classifier. The first score indicates a likelihood that the multi-channel audio corresponds to a particular audio type that the particular application is configured to process. The method also includes determining whether to accept or reject the multi-channel audio for processing by the particular application based on the first score generated as output from the application-specific classifier.

20 Claims, 9 Drawing Sheets

Related U.S. Application Data continuation of application No. 17/077,679, filed on Oct. 22, 2020, now Pat. No. 11,380,302.

(56) References Cited

U.S. PATENT DOCUMENTS

| | | | |
|---|---|---|---|
| 2019/0341057 A1* | 11/2019 | Zhang | G10L 25/78 |
| 2020/0349928 A1* | 11/2020 | Mandal | G10L 15/30 |
| 2022/0093106 A1* | 3/2022 | Mosayyebpour Kaskari | G06N 3/044 |
| 2022/0093108 A1 | 3/2022 | Lesso | |

OTHER PUBLICATIONS

Catch You as I Can: Indoor Localization via Ambient Sound Signature and Human Behavior, Du, Zheng, Liu, Gu, Jul. 11, 2013.
VoipLoc: Compromising location-privacy via acoustic side-channel attacks, Jul. 15, 2020.

* cited by examiner

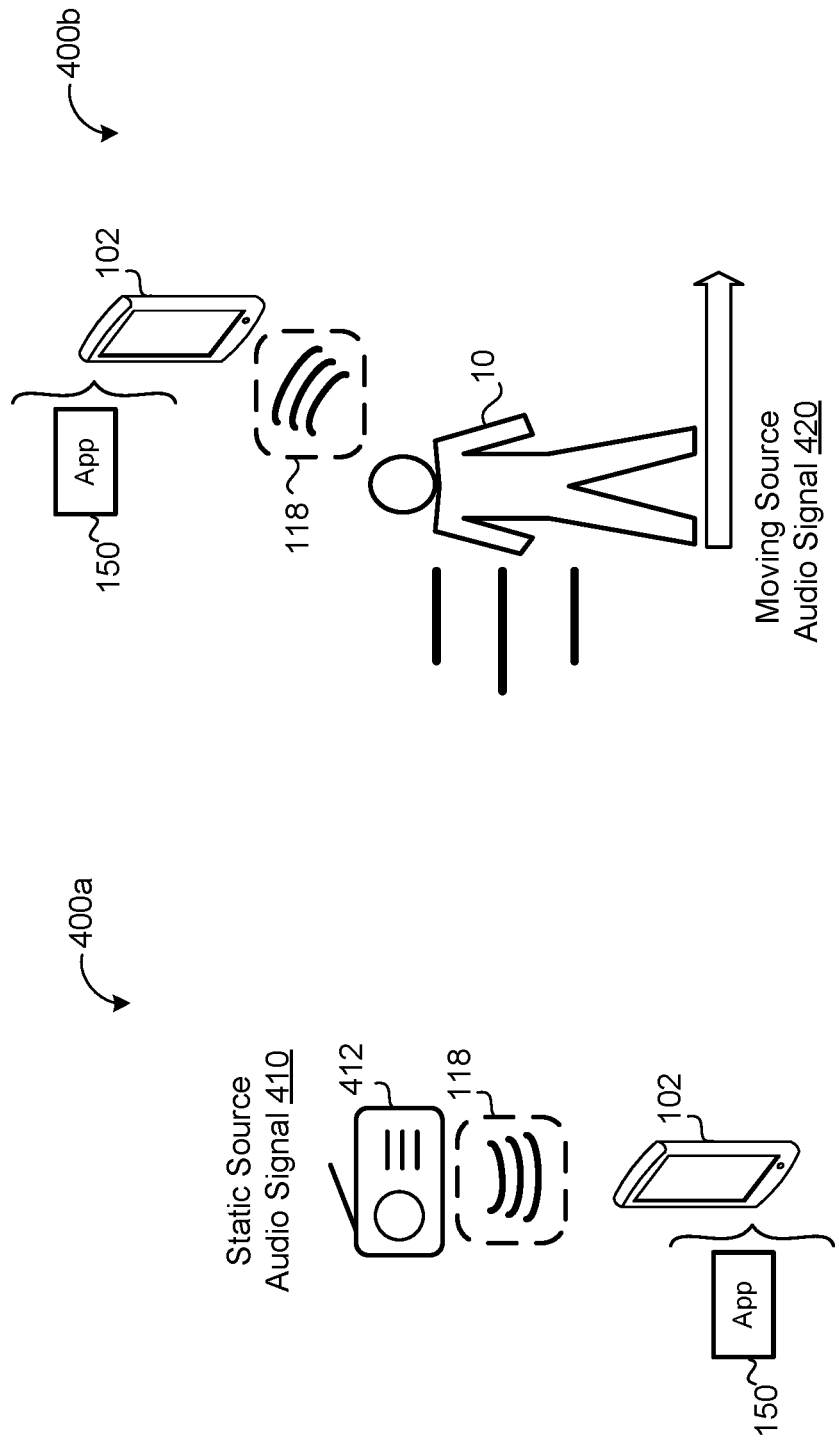

MULTI-CHANNEL VOICE ACTIVITY DETECTION

CROSS REFERENCE TO RELATED APPLICATIONS

This U.S. patent application is a continuation of, and claims priority under 35 U.S.C. § 120 from, U.S. patent application Ser. No. 17/806,198, filed on Jun. 9, 2022, which is a continuation of U.S. patent application Ser. No. 17/077,679, now U.S. Pat. No. 11,380,302, filed on Oct. 22, 2020. The disclosures of these prior applications are considered part of the disclosure of this application and are hereby incorporated by reference in their entireties.

TECHNICAL FIELD

This disclosure relates to multi-channel voice activity detection.

BACKGROUND

Speech-enabled devices have increased in popularity over the past several years. One challenge for speech-enabled devices is the ability to discern between background noise from the surrounding environment and speech directed towards the device. This ability allows the device to decide whether received audio input requires the device to further process the audio (e.g., to process a command or query) or simply to ignore the received audio. The ability for the device to discern between background noise and speech directed towards the device becomes difficult when the device is subject to an environment where different sources of audio contribute to background noise.

SUMMARY

One aspect of the disclosure provides a method for multi-channel voice activity detection. The method includes receiving, at data processing hardware of a user device, a sequence of input frames characterizing streaming multi-channel audio captured by an array of microphones in communication with the data processing hardware. Each channel of the streaming multi-channel audio may include respective audio features captured by a separate dedicated microphone in the array of microphones. The method also includes determining, by the data processing hardware, using a location fingerprint model, a location fingerprint indicating a location of a source of the multi-channel audio relative to the user device based on the respective audio features of each channel of the multi-channel audio. The method also includes generating, by the data processing hardware, as output from an application-specific classifier configured to receive the location fingerprint as input, a first score indicating a likelihood that the multi-channel audio corresponds to a particular audio type that a particular application is configured to process. The method also includes determining, by the data processing hardware, whether to accept or reject the multi-channel audio for processing by the particular application based on the first score generated as output from the application-specific classifier.

Implementations of the disclosure may include one or more of the following optional features. In some implementations, the method further includes generating, by the data processing hardware, using a voice activity detector (VAD) model, a second score indicating a likelihood that the multi-channel audio corresponds to human-originated speech. In this implementation, determining whether to accept or reject the multi-channel audio for processing by the particular application is further based on the second score indicating the likelihood that the multi-channel audio corresponds to human-originated speech.

In some examples, determining whether to accept or reject the multi-channel audio for processing by the particular application includes combining the first score and the second score into a combined score and determining whether the combined score satisfies an acceptance threshold. In this example, the method also includes one of when the combined score satisfies the acceptance threshold, accepting the multi-channel audio for processing by the particular application or when the combined score fails to satisfy the acceptance threshold, rejecting the multi-channel audio for processing by the particular application.

Optionally, the method further includes generating, by the data processing hardware, an aggregated fingerprint based on the location fingerprint and one or more previous location fingerprints. The method may also include extracting, by the data processing hardware, using a beamformer configured to receive the aggregated fingerprint as input, a single channel of audio data from the multi-channel audio. The extracted single channel of audio data includes only respective audio features that correspond to the location of the source indicated by the location fingerprint. Here, generating the second score indicating the likelihood that the multi-channel audio corresponds to human-originated speech may include generating the second score as output from the VAD model based on the extracted single channel of audio data received as input to the VAD model.

The method may include adjusting, by the data processing hardware, the second score based on a confidence level of the beamformer. In some implementations, the particular audio type that the particular application is configured to process may include one of audio with a single source location or audio with a multiple source location. In some examples, the particular audio type that the particular application is configured to process may include one of audio with a moving source location or audio with a static source location. Optionally, the particular audio type that the particular application is configured to process may include one of near source audio or far source audio. The particular audio type that the particular application is configured to process may include one of point source audio or speaker system audio.

In some implementations, determining the location fingerprint indicating the location of the source of the multi-channel audio relative to the user device includes processing each channel of the multi-channel audio using a time difference of arrival and gain model. Determining the location fingerprint indicating the location of the source of the multi-channel audio relative to the user device may include processing each channel of the multi-channel audio using a spatial probability model.

In some examples, the method further includes generating, by the data processing hardware, as output from the application-specific classifier, based on the location fingerprint, a second score indicating a likelihood that the multi-channel audio corresponds to an audio type different than the particular audio type that the particular application is configured to process and ignoring, by the data processing hardware, subsequent streaming multi-channel audio with the same location fingerprint. Optionally, the application-specific classifier is trained on positive training samples that include multi-channel audio corresponding to the particular audio type that the particular application is configured to process and negative training samples that include multi-channel audio corresponding to one or more other audio types that the particular application is not configured to process.

Another aspect of the disclosure provides a system for multi-channel voice activity detection. The system includes data processing hardware of a user device and memory hardware in communication with the data processing hardware. The memory hardware stores instructions that when executed on the data processing hardware cause the data processing hardware to perform operations. The operations include receiving a sequence of input frames characterizing streaming multi-channel audio captured by an array of microphones in communication with the data processing hardware. Each channel of the streaming multi-channel audio may include respective audio features captured by a separate dedicated microphone in the array of microphones. The operations also include determining, using a location fingerprint model, a location fingerprint indicating a location of a source of the multi-channel audio relative to the user device based on the respective audio features of each channel of the multi-channel audio. The operations also include generating, as output from an application-specific classifier configured to receive the location fingerprint as input, a first score indicating a likelihood that the multi-channel audio corresponds to a particular audio type that a particular application is configured to process. The operations also include determining whether to accept or reject the multi-channel audio for processing by the particular application based on the first score generated as output from the application-specific classifier.

This aspect may include one or more of the following optional features. In some implementations, the operations further include generating, using a voice activity detector (VAD) model, a second score indicating a likelihood that the multi-channel audio corresponds to human-originated speech. In this implementation, determining whether to accept or reject the multi-channel audio for processing by the particular application is further based on the second score indicating the likelihood that the multi-channel audio corresponds to human-originated speech.

In some examples, determining whether to accept or reject the multi-channel audio for processing by the particular application includes combining the first score and the second score into a combined score and determining whether the combined score satisfies an acceptance threshold. In this example, the operations also include one of when the combined score satisfies the acceptance threshold, accepting the multi-channel audio for processing by the particular application or when the combined score fails to satisfy the acceptance threshold, rejecting the multi-channel audio for processing by the particular application.

Optionally, the operations further include generating an aggregated fingerprint based on the location fingerprint and one or more previous location fingerprints and extracting, using a beamformer configured to receive the aggregated fingerprint as input, a single channel of audio data from the multi-channel audio. The extracted single channel of audio data includes only respective audio features that correspond to the location of the source indicated by the location fingerprint. Here, generating the second score indicating the likelihood that the multi-channel audio corresponds to human-originated speech may include generating the second score as output from the VAD model based on the extracted single channel of audio data received as input to the VAD model.

The operations may include adjusting the second score based on a confidence level of the beamformer. In some implementations, the particular audio type that the particular application is configured to process may include one of audio with a single source location or audio with a multiple source location. In some examples, the particular audio type that the particular application is configured to process may include one of audio with a moving source location or audio with a static source location. Optionally, the particular audio type that the particular application is configured to process may include one of near source audio or far source audio. The particular audio type that the particular application is configured to process may include one of point source audio or speaker system audio.

In some implementations, determining the location fingerprint indicating the location of the source of the multi-channel audio relative to the user device includes processing each channel of the multi-channel audio using a time difference of arrival and gain model. Determining the location fingerprint indicating the location of the source of the multi-channel audio relative to the user device may include processing each channel of the multi-channel audio using a spatial probability model.

In some examples, the operations further include generating, as output from the application-specific classifier, based on the location fingerprint, a second score indicating a likelihood that the multi-channel audio corresponds to an audio type different than the particular audio type that the particular application is configured to process and ignoring subsequent streaming multi-channel audio with the same location fingerprint. Optionally, the application-specific classifier is trained on positive training samples that include multi-channel audio corresponding to the particular audio type that the particular application is configured to process and negative training samples that include multi-channel audio corresponding to one or more other audio types that the particular application is not configured to process.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4A is a schematic view of an example static-source audio signal.

FIG. 4B is a schematic view of an example moving source audio signal.

Like reference symbols in the various drawings indicate like elements.

DETAILED DESCRIPTION

Speech-enabled devices and/or voice-enabled devices are subject to audio from the surrounding environment. Often, these devices receive audio input that includes background noise that is not directed toward the device (e.g., from an ambient conversation, a television, etc.). Typically, it is desirable for the speech-enabled device to ignore audio not directed at the device (e.g., not respond or further process the audio). For example, a speech-enabled device that receives audio input from a television is generally expected to ignore the received audio. However, when a user speaks directly to the speech-enabled device (e.g., a command or a query), the device should respond to the user. In an environment with significant background noise, isolating audio directed toward the speech-enabled device becomes difficult.

Implementations herein are directed toward a system that includes a multi-channel voice activity detector (VAD) that determines when streaming audio input includes human speech directed toward a speech-enabled device. The system determines a location fingerprint based on streaming multi-channel audio received from an audio source and determines whether the location fingerprint is compatible with types of audio that correspond to an application of the speech-enabled device. Optionally, a beamformer extracts an audio channel from the multi-channel streaming audio and passes the extracted audio channel to the VAD to determine whether the extracted audio channel is consistent with human speech. Based on the location fingerprint and the VAD determination, the system accepts or rejects the multi-channel streaming audio for processing by a particular application (e.g., hotword detection, automatic speech recognition (ASR), etc.).

Figure 1:
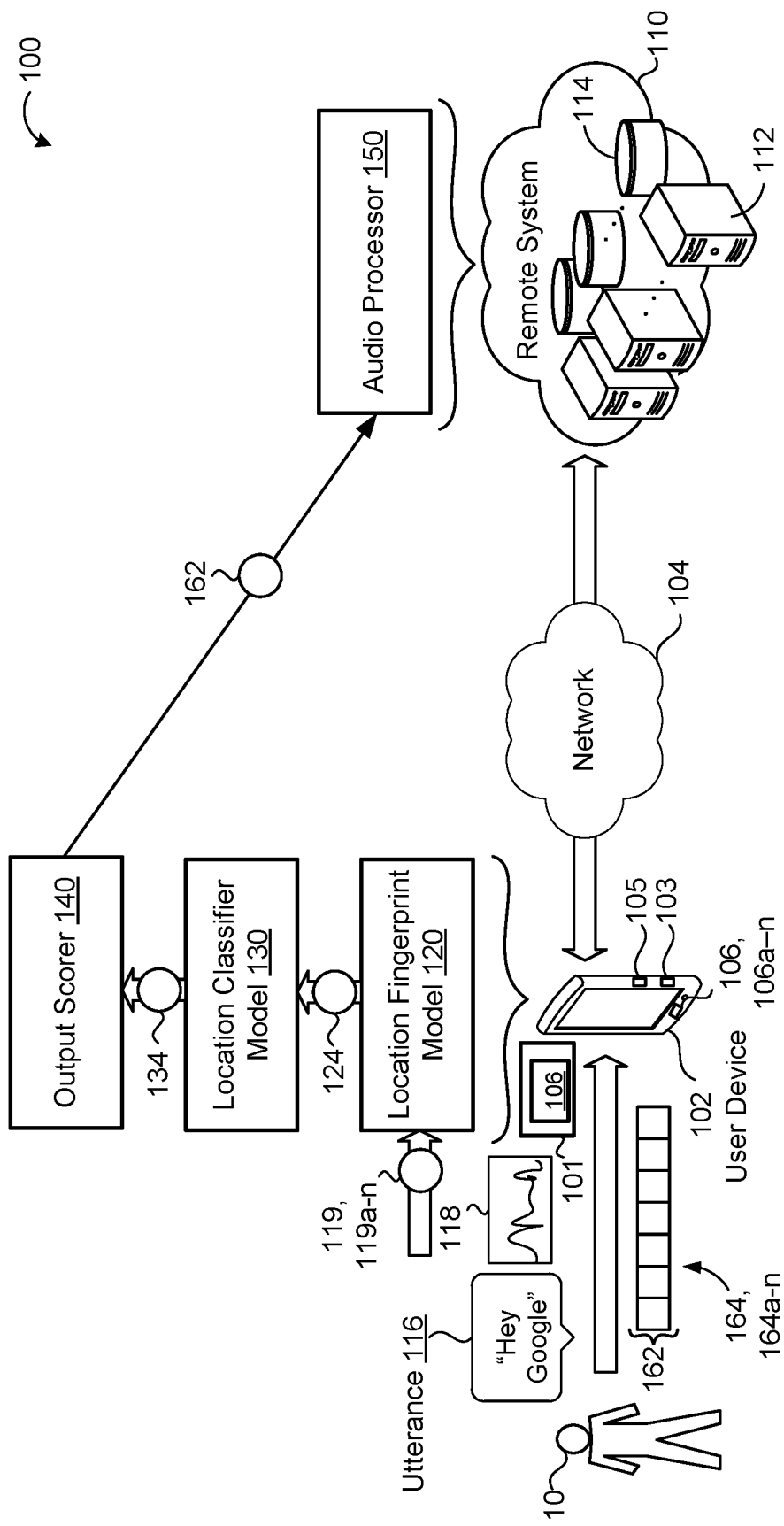
FIG. 1 is a schematic view of an example system for a multi-channel voice activity detector.

Referring now to FIG. 1, in some implementations, an example system 100 includes one or more user devices 102 each associated with a respective user 10 and in communication with a remote system 110 via a network 104. Each user device 102 may correspond to a computing device, such as a mobile phone, computer, wearable device, smart appliance, audio infotainment system, smart speaker, etc., and is equipped with data processing hardware 103 and memory hardware 105. The remote system 110 may be a single computer, multiple computers, or a distributed system (e.g., a cloud environment) having scalable/elastic computing resources 112 (e.g., data processing hardware) and/or storage resources 114 (e.g., memory hardware). The user device 102 obtains a sequence of input frames 164, 164a-n characterizing streaming multi-channel audio 118 captured by an array of microphones 106, 106a-n in communication with the remote system 110.

Each channel 119, 119a-n of the streaming multi-channel audio 118 includes respective audio features 162 captured by a separate dedicated microphone 106 in the array of microphones 106, 106a-n. The user device 102 includes (or is in communication with) two or more microphones 106 to capture the utterance 116 from the user 10. Each microphone 106 may separately record the utterance 116 on a separate dedicated channel 119 of the multi-channel streaming audio 118. For example, the user device 102 includes two microphones 106 that each record the utterance 116, and the recordings from the two microphones 106 may be combined into two-channel streaming audio 118 (i.e., stereophonic audio or stereo). Additionally or alternatively, the user device 102 may be in communication with one or more microphones separate/remote from the user device 102. For example, the user device 102 is a mobile device disposed within a vehicle and in wired or wireless communication (e.g., Bluetooth) with two or more microphones of the vehicle. In some configurations, the user device 102 is in communication with least one microphone 106 residing on a separate device 101, which may include, without limitation, an in-vehicle audio system, a computing device, a speaker, or another user device. In these configurations, the user device 102 may also be in communication with one or more microphones residing on the separate device 101.

The user device 102 executes a location fingerprint model 120. The location fingerprint model 120 receives each channel 119 of the multi-channel streaming audio 118 and determines a location fingerprint 124 that indicates a location of a source (or multiple sources) of the multi-channel audio 118 relative to the user device 102 based on the respective audio features 162 of each channel 119 of the multi-channel audio 118. That is, the location fingerprint 124 may include a location embedding derived from the multi-channel streaming audio 118. In some examples, the location fingerprint 124 is representative of a direction of the source of the multi-channel audio 118 relative to the user device 102.

In some implementations, the location fingerprint model 120 determines the location fingerprint 124 by processing each channel 119 of the multi-channel audio 118 using a time difference of arrival and gain model. That is, the location fingerprint model 120 uses a difference in arrival times and gain in the respective channels 119 of the multi-streaming audio 118. In other implementations, the location fingerprint model 120 determines the location fingerprint 124 by processing each channel 119 of the multi-channel audio 118 using a spatial probability model (e.g., a Steered-Response Power Phase Transform (SRP-PHAT) algorithm).

The user device 102 also executes a location classifier model 130 (also referred to herein as an application-specific classifier model). As described in more detail below, the location classifier model 130 classifies the location fingerprint 124 based on a particular application executed by the user device 102. The location classifier model generates a first score 134 indicating a likelihood that the multi-channel audio 118 corresponds to a particular audio type that the particular application is configured to process. That is, the user device 102 and/or the remote system 110 execute a particular application (e.g., a hotword detector, an automatic speech recognizer, etc.) that the location fingerprint model 120 is configured for. An output scorer 140 receives the first score 134. In some implementations, the output scorer 140 determines whether to accept or reject the multi-channel audio 118 for processing by the particular application based on the first score 134 generated as output from the location classifier model 130. For example, the output scorer 140 determines whether the first score 134 satisfies a first score threshold.

Here, when the output scorer 140 determines that the first score satisfies the first score threshold, the output scorer 140 transmits the audio features 162 of the multi-streaming audio 118 to an audio processor 150 executing on the remote system 110 for further processing based on the particular application. In other examples, the user device 102 executes the audio processor 150 and the output scorer 140 passes the audio features 162 (or any other form of the streaming audio 118) to the local audio processor 150 (e.g., a hotword detector, an automated speech recognizer, etc.). Similar to the audio processor 150, the location fingerprint model 120 and location classifier model 130 may additionally or alternatively be executed by the remote system 110 and/or the user device 102.

In the example shown, when the user 10 speaks an utterance 116 including a hotword (e.g., "Hey Google"), the user device 102 captures the streaming audio 118 characterized by the sequence of input frames 164. The location fingerprint model 120 generates the location fingerprint 124 based on the spoken utterance 116 (e.g., "Hey Google") and transmits the location fingerprint 124 to the location classifier model 130. The location classifier model 130 generates, based on the location fingerprint 124, the first score 134 indicating the likelihood that the channels 119 correspond to a particular type of audio that the particular application (i.e., the audio processor 150) is configured to process. The audio processor 150 performs further processing on the channels of streaming audio 119 (e.g., the audio features 162) in accordance with the particular application. In some examples, the audio processor 150 is configured to detect the presence of a hotword in the utterance 116 to initiate a wake-up process on the user device 102 for processing the hotword and/or one or more other terms (e.g., query or command) following the hotword in the utterance 116.

Figure 2:
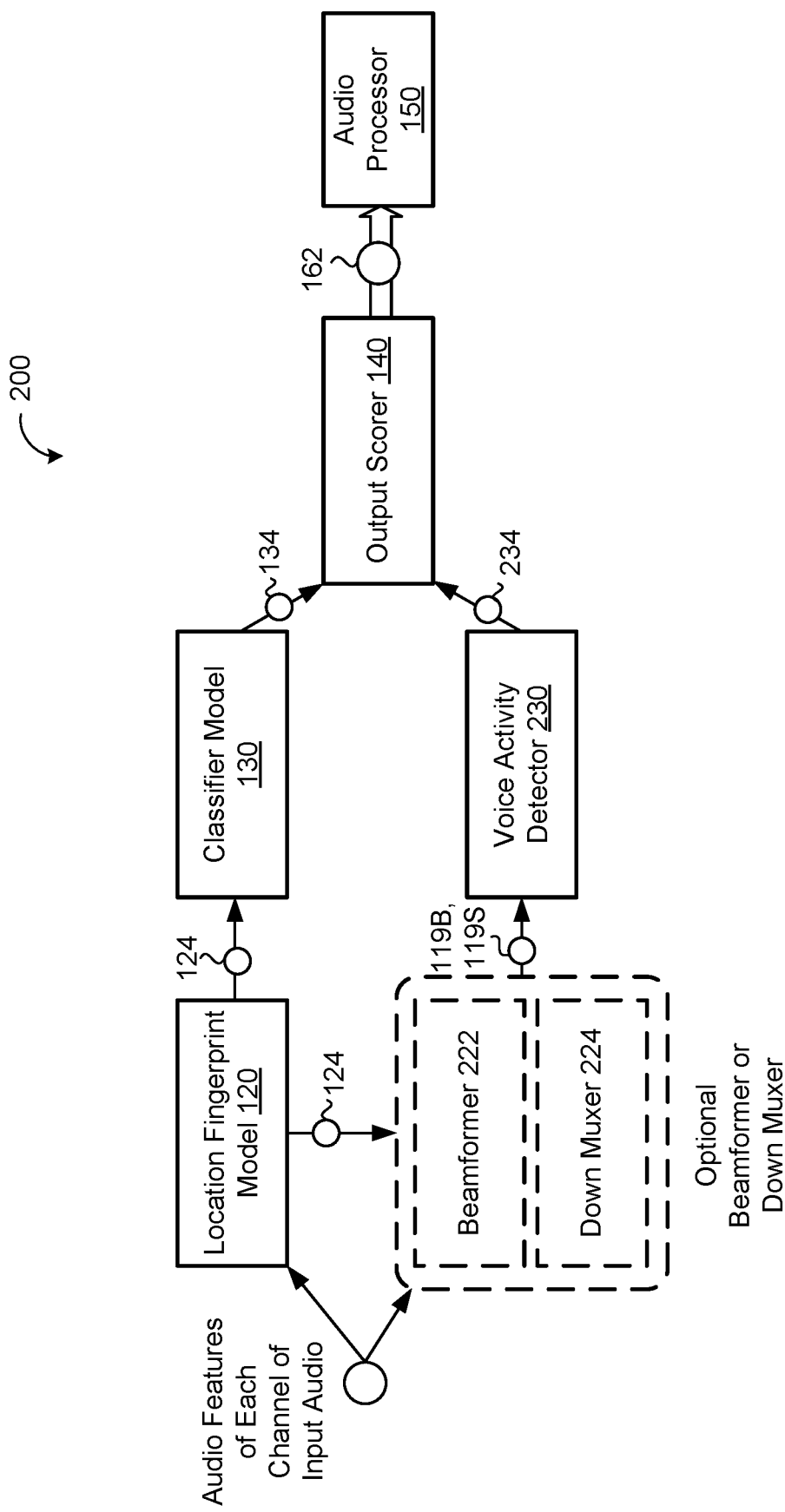
FIG. 2 is a schematic view of exemplary components of the multi-channel voice activity detector of FIG. 1.

Referring now to FIG. 2, in some implementations, the user device 102 executes a beamformer 222. The beamformer 222 receives each channel of streaming audio 119 and extracts a single channel 119B from the multi-channel streaming audio 118. The extracted single channel of audio 119B may include only respective audio features 162 that correspond to the location of the source of the streaming audio 118 (e.g., the source indicated by the location fingerprint 124). That is, in some examples, the beamformer 222 extracts the single channel of audio data 119B from the multi-channel audio 118 captured by the microphones 106 in the array of microphones 106. The beamformer 222 may use the location fingerprint 124 to perform beamforming (i.e., spatial filtering for directional signal reception) on the multi-channel audio 118 to extract the audio consistent with the location indicated by the location fingerprint 124. That is, the beamformer 222 may emphasize audio received in the direction indicated by the location fingerprint 124 and de-emphasize audio received from other directions (i.e., reduce background noise that does not originate from the same direction as the multi-streaming audio 118). In some implementations, the beamformer 222 is stateful to ensure that the extracted channel of audio 119B is temporally stable.

Optionally, the beamformer 222 may receive an aggregated fingerprint in place of or in addition to the location fingerprint 124. For example, an aggregator model (or alternatively the beamformer 222 itself) performs stateful processing of the location fingerprint 124 that includes processing a sequence of location fingerprints 124 previously generated by the location fingerprint model 120. The aggregator model (or beamformer 222) may include storage to maintain any number of previously generated location fingerprints 124.

In some examples, instead of a beamformer 222, the user device 102 executes a down muxer 224 (i.e., a multiplexor). The down muxer 224 may select a channel 119S of the multi-channel streaming audio 118 most consistent with audio source indicated by the location fingerprint 124. The down-muxer 224 may be beneficial where the complexity and/or computational power of the beamformer 222 is not required for a particular application, but still a single channel of audio 119S is necessary for voice activity detection. The beamformer 222 (or the down muxer 224) transmits the single channel of audio 119B, 119S to a voice activity detector (VAD) model 230. The beamformer 222/down muxer 224 provides a high quality single channel of audio 119S, 119B for the VAD model 230 to process. The VAD model 230, based on the single channel of audio 119B, 119S, generates a second score 234 that indicates a likelihood that the single channel of audio 119B, 119S corresponds to human speech (i.e., the audio contains a human speaking). The VAD model 230 may use any conventional techniques for voice activity detection. In some examples, the VAD model 230 includes a neural network such as a deep neural network (DNN) or a convolutional neural network (CNN).

With continued reference to FIG. 2, the output scorer 140 receives both the first score 134 from the location classifier model 130 and the second score 234 from the VAD model 230. The output scorer 140 determines whether to accept or reject the multi-channel audio 118 for processing by the particular application (i.e., the audio processor 150) based on the first score 134 (indicating the likelihood that the multi-channel audio 118 corresponds to the particular audio type for the audio processor 150) and the second score 234 (indicating the likelihood that the multi-channel audio 118 corresponds to human-originated speech).

In some implementations, the audio processor 150 determines whether to accept or reject the multi-channel audio 118 for processing by the particular application based on one or more thresholds. For example, the output scorer 140 combines the first score 134 and the second score 234 and determine whether the combined score satisfies an acceptance threshold. In this scenario, the output scorer 140 may weight the first score 134 and/or the second score 234 (e.g., based on a confidence level of the location fingerprint 124 and/or the beamformer 222, a confidence multiplication, etc.). When the combined score satisfies the acceptance threshold, the output scorer 140 may accept the multi-channel audio 118 for further processing by particular application (i.e., the audio processor 150). When the combined score fails to satisfy the acceptance threshold, the output scorer 140 may reject the multi-channel audio 118 for processing by the particular application (i.e., the audio processor 150). The user device 102 may tune or adjust the acceptance threshold based on input from the user 10, the environment of the user device 102, and/or instructions received from the remote system 110

Alternatively, the output scorer 140 may determine whether the first score 134 satisfies the first score threshold and whether the second score 234 satisfies a second score threshold (i.e., a logical AND). The user device 102 may tune or adjust each threshold based on input from the user 10, the environment of the user device 102, and/or instructions received from the remote system 110. When the first score 134 satisfies the first score threshold and the second score 234 satisfies the second score threshold, the output scorer 140 accepts the multi-channel audio 118 for processing by the particular application and sends the audio features 162 (or other aspects of the multi-streaming audio 118) to the audio processor 150 (executing at either the user device 102 or the remote system 110). When the first score 134 fails to satisfy the first score threshold and/or the second score 234 fails to satisfy the second score threshold, the output scorer 140 rejects the multi-channel audio 118 for processing by the particular application.

Figure 3B:
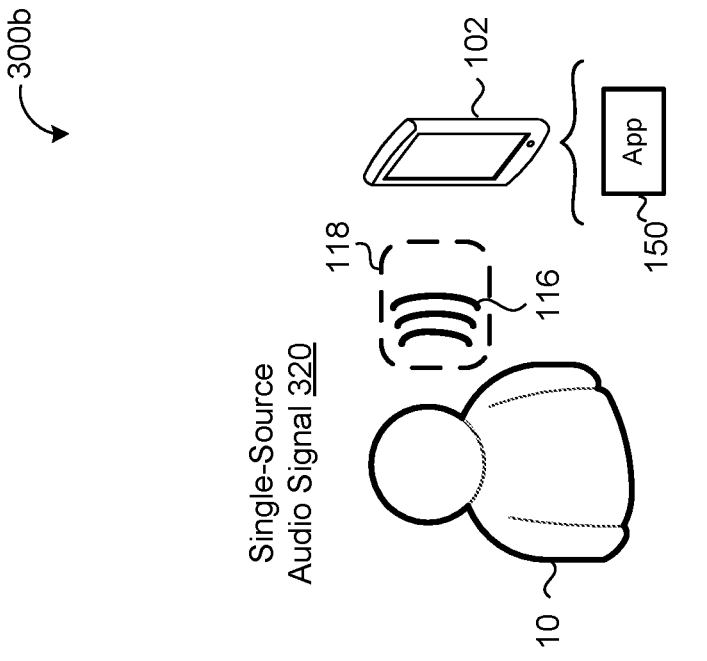
FIG. 3B is a schematic view of an example single-source audio signal.
Figure 3A:
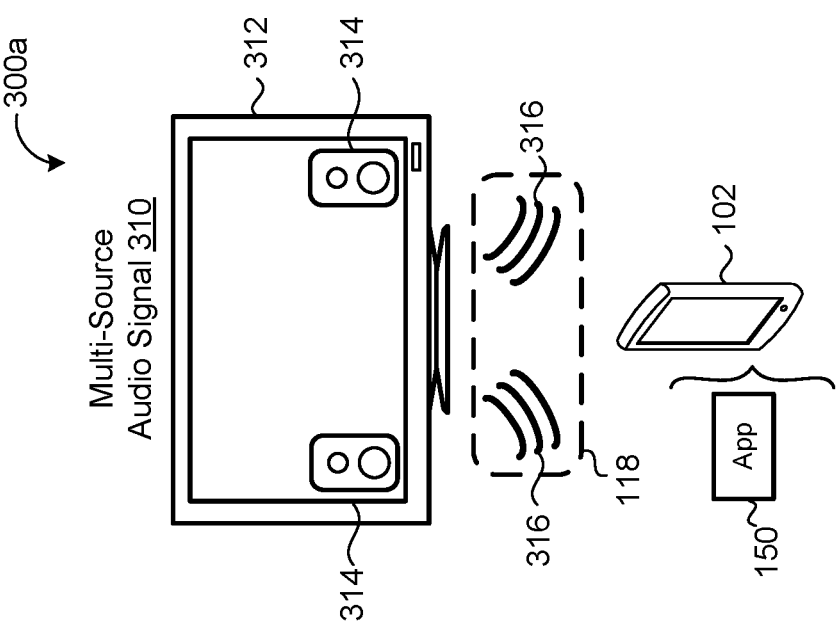
FIG. 3A is a schematic view of an example multi-source audio signal.

Referring now to FIG. 3A and FIG. 3B, in some implementations, the particular audio type that the particular application is configured to process is based upon an attribute of the source of the multi-channel streaming audio 118. For example, the particular audio type that the particular application is configured to process includes one of audio with a single source location 320 or audio with a multiple source location 310. In FIG. 3A, a television 312 includes two or more speakers 314. Each speaker emits audio 316 to form multi-source streaming audio 118. In this example, the location fingerprint model 120 determines that the multi-channel audio 118 from the television 312 has multiple sources. In FIG. 3B, the user 10 provides the utterance 116 to form streaming audio 118 with a single-source audio signal 320. In contrast to the example of FIG. 3A, the location fingerprint model 120 may determine that the utterance 116 from the user 10 of FIG. 3B is a single-source audio signal 320. Thus, the location classifier model 130 (based on the location fingerprint 124) may determine whether the streaming audio 118 originates from a single source 320 or multiple sources 310. For some particular applications, the output scorer 140 rejects streaming audio 118 that originates from a single source or from multiple sources 310. For example, when the particular application is a hotword detector configured to detect presence of a hotword in speech from a user, streaming audio 118 with multiple sources (e.g., from the television 312) is unlikely to be audio that the audio processor 150 is configured to process (i.e., a hotword from a user in this case).

In some implementations, the location classifier model 130 generates the second score 234, based on the location fingerprint 124, to indicate a likelihood that the multi-channel audio 118 corresponds to an audio type different than the particular audio type that the particular application is configured to process. For example, the location classifier model 130 generates the second score 234 indicating the likelihood the multi-channel audio 118 corresponds to a multi-source audio 310 when the particular application is configured to process single source audio 320. In this scenario, the user device 102 and/or the remote system 110 may ignore subsequent streaming multi-channel audio 118 with the same location fingerprint 124. That is, continuing with the previous example, when the location classifier model 130 generates the second score 136 that indicates the streaming audio 118 is from multi-source audio 310 (e.g., the television 312), the output scorer 140 rejects the streaming audio 118 as the audio processor 150 is configured to process single source audio 320. The output scorer 140 may ignore subsequent multi-channel audio 118 with the same location fingerprint 124 as it is likely the streaming audio 118 comes the from the same previously rejected source (i.e., the television 312). In some examples, the particular audio type that the application is configured to process includes one of point source audio or speaker system audio.

Referring now to FIG. 4A-B, in some implementations, the particular audio type that the particular application is configured to process includes one of audio with a moving source location 420 or audio with a static source location 410. In FIG. 4A, a radio 412 transmits streaming audio 118 to the user device 102. The radio 412, in this example, is fixed in place and produces a static (i.e., non-moving) source for the streaming audio 118. In contrast, FIG. 4B illustrates a user 10 that is moving while generating the streaming audio 118 received by the user device 102. Here, the streaming audio 118 has a moving source location. In some implementations, based on the location fingerprint 124, the location classifier model 130 classifies the streaming audio 118 as a static source or a moving source. The output scorer 140 may accept or reject the streaming audio based at least on part on whether the source of the streaming audio 118 is moving or static. For example, when the user device 102 is a cell phone, typically the user queries the user device 102 from a static location relative to the user device 102. For example, the user 10 holds the user device 102 in front of the user 10 and submits the query to the user device 102. In this examples, the user device 102 is more likely to reject streaming audio 118 that has a moving source, as a moving source is more likely to be ambient conversation that is not directed toward the user device 102.

Figure 5:
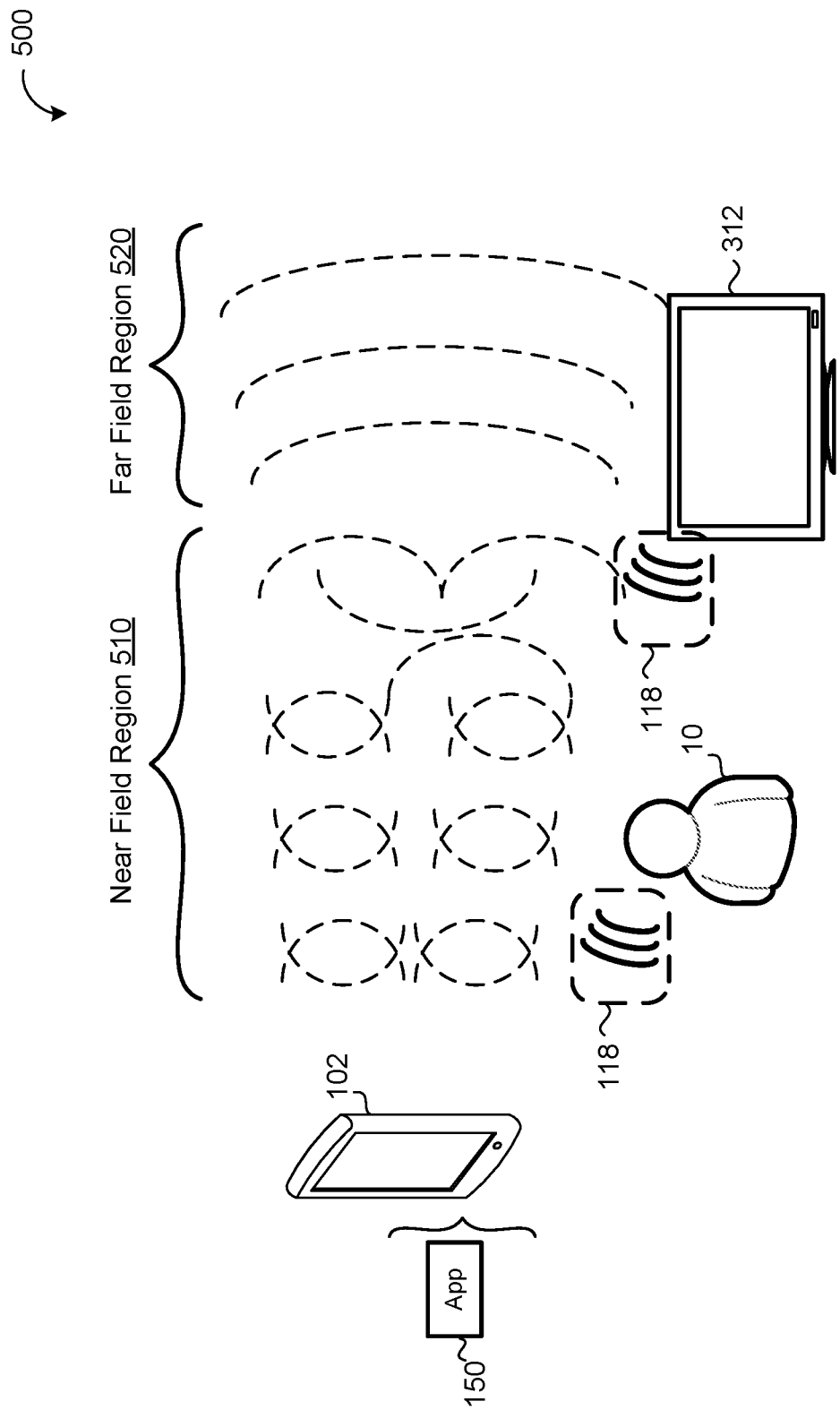
FIG. 5 is a schematic view of an example of a near field region and far field region of a user device.

Referring now to FIG. 5, in some implementations, the particular audio type that the particular application is configured to process includes one of a near source audio or far source audio. For example, the location classifier model 130 determines the first score 134 at least partially based on whether the user device 102 is located within a near field region 510 of the electromagnetic field of the user device 102 or a far field region 520 of the electromagnetic field around the user device 102. For example, in FIG. 5, the user 10 provides streaming audio 118 that originates within the near field region 510 of the user device 102. In contrast, the television 312 emits streaming audio 118 that originates within the far field region 520 of the user device 102. The output scorer 140 may accept or reject streaming audio 118 (e.g., via the first score 134) based at least partially on whether the source of the streaming audio is within the near field region 510 of the user device 102 or the far field region 520 of the user device 102. For example, when the user device 102 is a cell phone, the user 10 will typically engage the speech-enabled user device 102 when the user 10 is within the near field region 510 of the user device 102. Thus, the user device 102 may be more likely to reject streaming audio 118 that originates from within the far field region 520 of the user device 102 (i.e., from sources that are not near the cell phone). In some implementations, the user device 102 performs arbitration between multiple speech-enabled user devices 102 that each received streaming audio 118 based at least partially on the near field region 510 and the far field region 520. For example, when two different user devices 102 each receive a voice query, the user devices 102 uses the near field region 510 and the far field region 520 to determine which user device 102 is closer to the source of the streaming audio 118, and the closer user device 102 may respond to the voice query.

Figure 6:
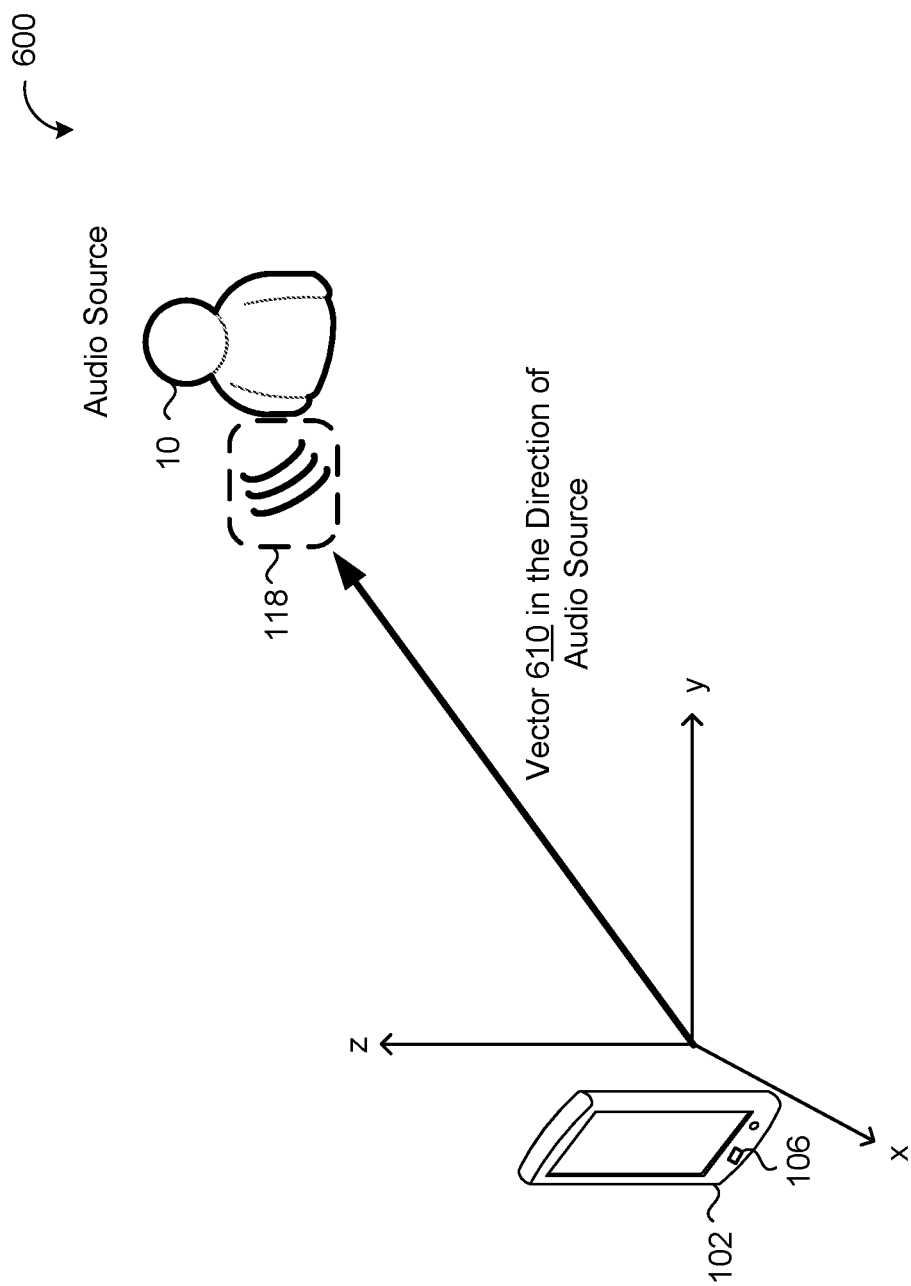
FIG. 6 is a schematic view of a direction vector of a location fingerprint.

Referring now to FIG. 6, in some implementations, the location fingerprint model 120 generates a location fingerprint 124 that includes a source vector 610. The source vector 610 indicates a direction (e.g., in Cartesian coordinates) of the source of the streaming audio 118 relative to the user device 102. Here, the user 10 provides streaming audio 118 received by the user device 102 at the plurality of microphones 106. Based on the respective channels of audio data 119, the location fingerprint model 120 determines a location fingerprint 124 that includes the vector 610 that indicates the direction of the user 10 relative to the user device 102.

Figure 7:
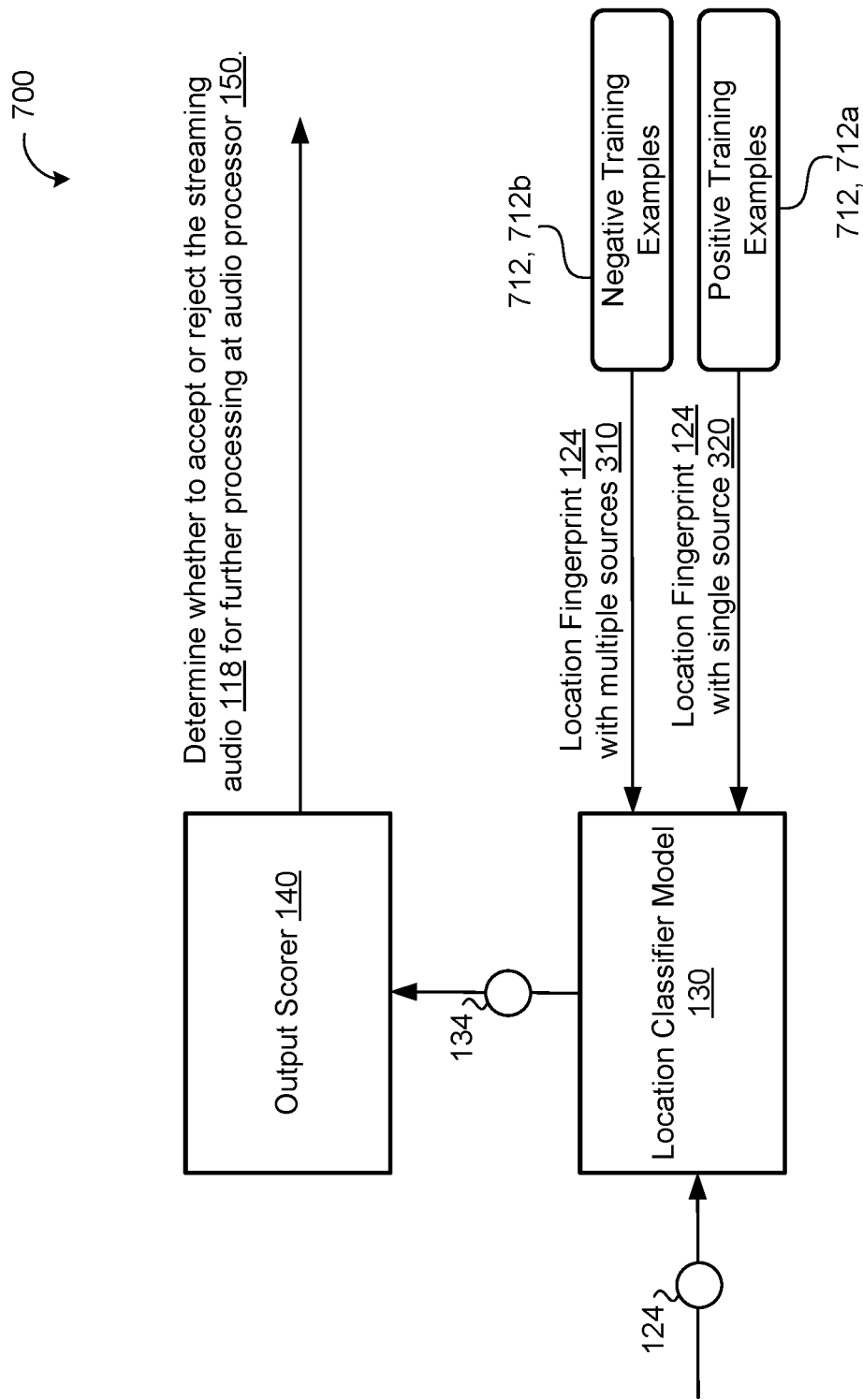
FIG. 7 is a schematic view of training a location classifier model of the multi-channel voice activity detector.

FIG. 7 is an example of the location classifier model 130 within a user device 102 of the system 100. The location classifier model 130 is configured to determine whether the location fingerprint 124 (based off the streaming audio 118) corresponds to a particular audio type that a particular application of the user device 102 or the remote system 110 is configured to process. In the example of FIG. 7, the location classifier model 130 is configured to determine whether the streaming audio 118 has a single source (i.e., a point source) or multiple sources (e.g., speaker system audio).

In addition to being trained on positive training examples 712, 712b containing location fingerprints 124 that include audio representations of single source audio 310, the location classifier trainer 710 may be trained on negative training examples 712, 712a of location fingerprints 124 with multiple source audio 310 to thereby teach the location classifier model 130 to discern between single-source human-generated utterances 320 and multiple-source human-generated utterances 310 (generated by, for example, a television 312). In some implementations, the location classifier model 130 is trained using negative training examples 712a and positive training examples 712b. A negative training example 712a is a sample of audio that the location classifier model 130 should ignore (e.g., provide a low first score 134). Here, in order to prevent additional processing of streaming audio 118 that is not likely to originate for the user 10, the negative training examples 712a are samples of audio corresponding to multiple-source audio 310. The audio of one or more negative training example(s) 712a may include speech that otherwise may initiate the additional processing (e.g., a hotword). By disregarding multiple-source audio 310 (e.g., by providing a low first score 134 to the output scorer 140), the location classifier model 130 prevents the initiation further processing of the streaming audio 180 by the audio processor 150.

In contrast, a positive training example 712b may be an audio sample of a single-source utterance 320 of human speech. The location classifier model 130 receives the positive training examples 212b to learn when the location classifier model 130 should initiate the additional processing. The positive training examples 712b may include utterances that correspond to the particular application (e.g., inclusion of a hotword, a query, a command, etc.) for further processing.

The location classifier model 130 may be trained to detect any number of aspects of the location fingerprint 124. For example, the location classifier model 130 may determine some or all of whether the streaming audio 118 is single-source or multiple-source, whether the source of the streaming audio 118 is moving or static, and whether the source of the streaming audio 118 is near to the user device 102 or far from the user device 102. The location classifier model 130 may determine whether the source of the streaming audio 118 is in the same or similar direction as the source of previous streaming audio 118. In some examples, the location classifier model 130 and/or the location fingerprint model 120 determine that a first utterance and a second utterance originated from different sources. For example, an utterance that contains a hotword to initiate a system may originate from a first location and a subsequent query may originate from a second location. The system 100 may ignore or otherwise disregard the query in this case because the system may determine that the hotword was "hijacked" by another user.

The location classifier model 130 may determine any other aspects of the source of streaming audio 118 relevant to the particular application of the audio processor 150. The location classifier model 130 may be a neural network. For example, the location classifier model 130 is CNN or a DNN or any combination thereof. The location classifier model 130, in some examples, generates a Boolean indicating whether the location fingerprint 124 is accepted (i.e., the location fingerprint 124 corresponds with the use of the particular application) or is rejected (i.e., the location fingerprint 124 does not correspond with the user of the particular application).

Figure 8:
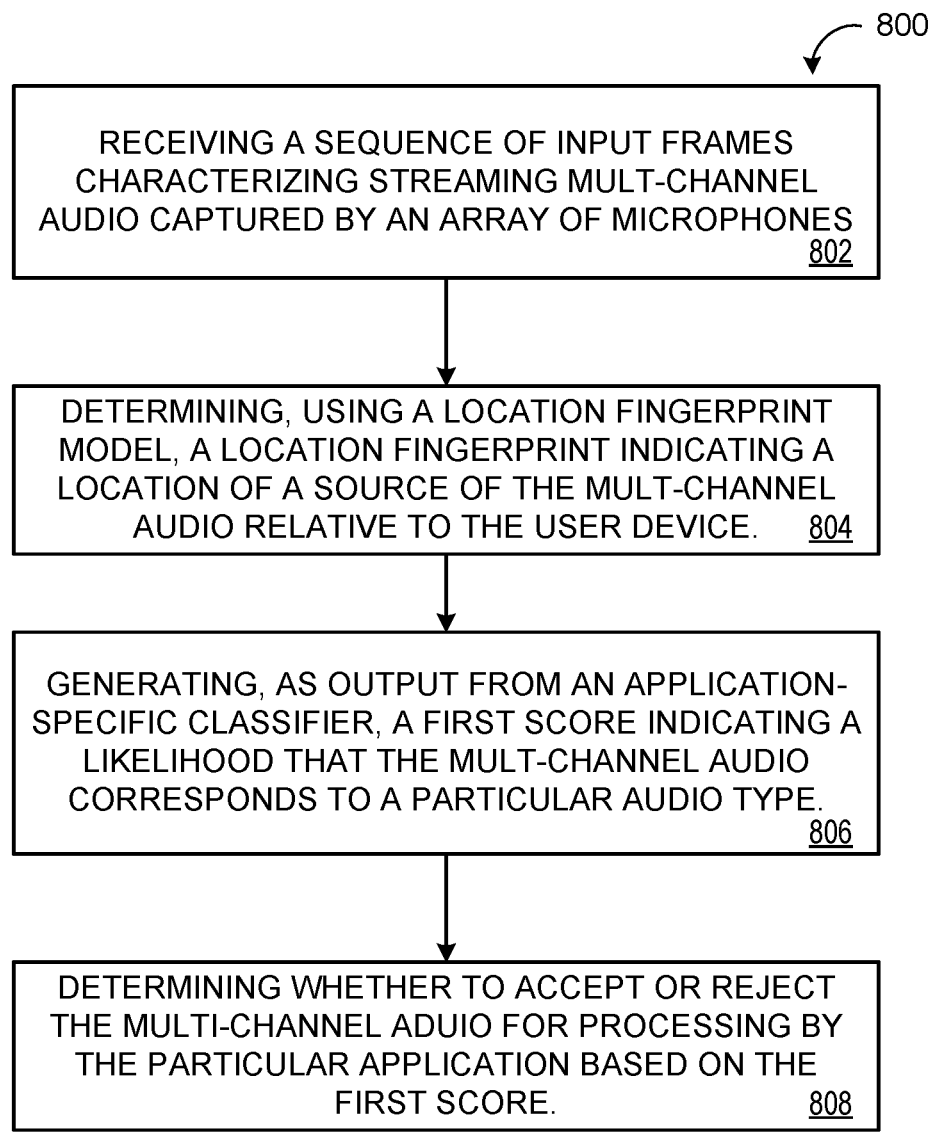
FIG. 8 is a flowchart of an example arrangement of operations for a method of multi-channel voice activity detection.

FIG. 8 is a flowchart of an example arrangement of operations for a method 800 for multi-channel voice activity detection. The method 800, at step 802, includes receiving, at data processing hardware 103 of a user device 102, a sequence of input frames 164 characterizing streaming multi-channel audio 118 captured by an array of microphones 106 in communication with the data processing hardware 103. Each channel 119 of the streaming multi-channel audio 118 includes respective audio features 162 captured by a separate dedicated microphone 106 in the array of microphones 106. At step 804, the method 800 includes determining, by the data processing hardware 103, using a location fingerprint model 120, a location fingerprint 124 indicating a location of a source of the multi-channel audio 118 relative to the user device 102 based on the respective audio features 162 of each channel 119 of the multi-channel audio 118. The location fingerprint 124 may represent a direction of the source of the multi-channel audio 118 relative to the user device 102.

At step 806, the method 800 also includes generating, by the data processing hardware 103, an output from an application-specific classifier model 130 configured to receive the location fingerprint 124 as input, a first score 134. The first score 134 indicates a likelihood that the multi-channel audio 118 corresponds to a particular audio type that the particular application is configured to process. At step 808, the method 800 also includes determining, by the data processing hardware 103, whether to accept or reject the multi-channel audio 118 for processing by the particular application based on the first score 134 generated as output from the application-specific classifier model 130.

Figure 9:
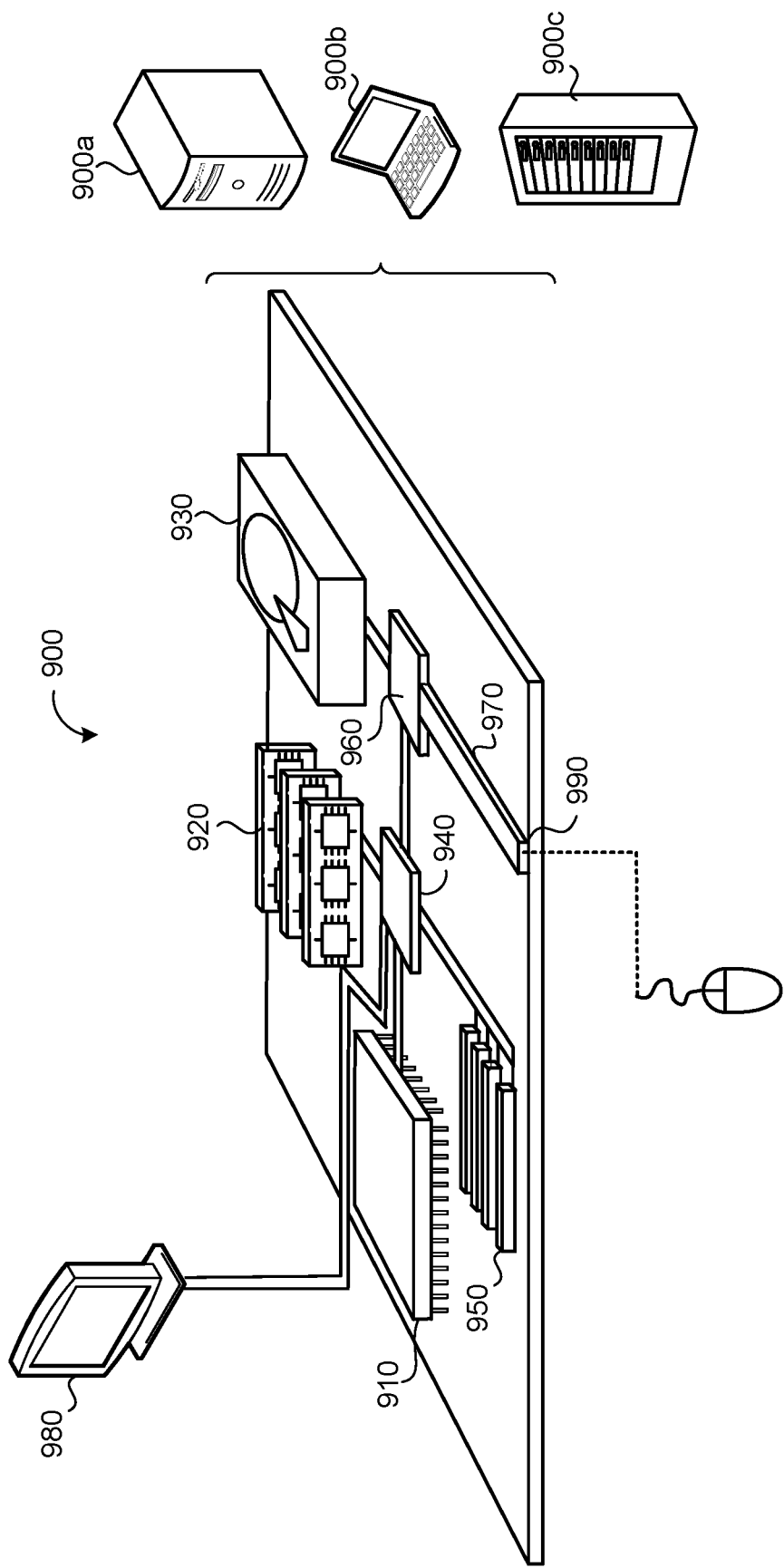
FIG. 9 is a schematic view of an example computing device that may be used to implement the systems and methods described herein.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to a low speed bus 970 and a storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and a low-speed expansion port 990. The low-speed expansion port 990, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware of a user device causes the data processing hardware to perform operations comprising:
   receiving streaming multi-channel audio captured by an array of microphones in communication with the data processing hardware, each channel of the multi-channel audio comprising respective audio features captured by a separate dedicated microphone in the array of microphones;
   processing the respective audio features of each channel of the multi-channel audio to determine an embedding associated with a source of the multi-channel audio;
   based on the embedding associated with the source of the multi-channel audio, determining a first score indicating the multi-channel audio originates from one of a moving source or a static source; and
   determining to reject the multi-channel audio for processing by a particular application based on the first score indicating that the multi-channel audio originates from the moving source.

2. The computer-implemented method of claim 1, wherein the embedding associated with the source of the multi-channel audio comprises a location embedding indicating a location of the source of the multi-channel audio relative to the user device.

3. The computer-implemented method of claim 1, wherein the embedding associated with the source of the multi-channel audio comprises a direction embedding indicating a direction of the source of the multi-channel audio relative to the user device.

4. The computer-implemented method of claim 1, wherein determining the first score indicating that the multi-channel audio originates from one of the moving source or the static source comprises executing a classifier model configured to:
   receive, as input, the embedding associated with the multi-channel audio; and
   generate, as output, the first score indicating a likelihood that the multi-channel audio originates from one of the moving source or the static source.

5. The computer-implemented method of claim 1, wherein the operations further comprise determining that the particular application is configured to process static source audio.

6. The computer-implemented method of claim 5, wherein the operations further comprise:
   determining that the first score satisfies a first score threshold; and
   based on determining that the first score satisfies the first score threshold, rejecting the multi-channel audio for processing by the particular application.

7. The computer-implemented method of claim 5, wherein the operations further comprise determining, using a voice activity detector (VAD) model, a second score indicating a likelihood that the multi-channel audio corresponds to human-originated speech.

8. The computer-implemented method of claim 7, wherein the operations further comprise:
   combining the first score and the second score into a combined score;
   determining that the combined score fails to satisfy an acceptance threshold; and
   based on determining that the combined score fails to satisfy the acceptance threshold, rejecting the multi-channel audio for processing by the particular application.

9. The computer-implemented method of claim 1, wherein processing the respective audio features of each channel of the multi-channel audio to determine the embedding associated with a source of the multi-channel audio comprises processing each channel of the multi-channel audio using a time difference of arrival and gain model.

10. The computer-implemented method of claim 1, wherein processing the respective audio features of each channel of the multi-channel audio to determine the embedding associated with a source of the multi-channel audio comprises processing each channel of the multi-channel audio using a spatial probability model.

11. A system comprising:
    data processing hardware of a user device; and
    memory hardware in communication with the data processing hardware, the memory hardware storing instructions that when executed on the data processing hardware cause the data processing hardware to perform operations comprising:
      receiving streaming multi-channel audio captured by an array of microphones in communication with the data processing hardware, each channel of the multi-channel audio comprising respective audio features captured by a separate dedicated microphone in the array of microphones;
      processing the respective audio features of each channel of the multi-channel audio to determine an embedding associated with a source of the multi-channel audio;
      based on the embedding associated with the source of the multi-channel audio, determining a first score indicating the multi-channel audio originates from one of a moving source or a static source; and
      determining to reject the multi-channel audio for processing by a particular application based on the first score indicating that the multi-channel audio originates from the moving source.

12. The system of claim 11, wherein the embedding associated with the source of the multi-channel audio comprises a location embedding indicating a location of the source of the multi-channel audio relative to the user device.

13. The system of claim 11, wherein the embedding associated with the source of the multi-channel audio comprises a direction embedding indicating a direction of the source of the multi-channel audio relative to the user device.

14. The system of claim 11, wherein determining the first score indicating that the multi-channel audio originates from one of the moving source or the static source comprises executing a classifier model configured to:
    receive, as input, the embedding associated with the multi-channel audio; and
    generate, as output, the first score indicating a likelihood that the multi-channel audio originates from one of the moving source or the static source.

15. The system of claim 11, wherein the operations further comprise determining that the particular application is configured to process static source audio.

16. The system of claim 11, wherein the operations further comprise:

determining that the first score fails to satisfy a first score threshold; and based on determining that the first score fails to satisfy the first score threshold, rejecting the multi-channel audio for processing by the particular application.

17. The system of claim 11, wherein the operations further comprise determining, using a voice activity detector (VAD) model, a second score indicating a likelihood that the multi-channel audio corresponds to human-originated speech.

18. The system of claim 17, wherein the operations further comprise:

combining the first score and the second score into a combined score;

determining that the combined score fails to satisfy an acceptance threshold; and based on determining that the combined score fails to satisfy the acceptance threshold, rejecting the multi-channel audio for processing by the particular application.

19. The system of claim 11, wherein processing the respective audio features of each channel of the multi-channel audio to determine the embedding associated with a source of the multi-channel audio comprises processing each channel of the multi-channel audio using a time difference of arrival and gain model.

20. The system of claim 11, wherein processing the respective audio features of each channel of the multi-channel audio to determine the embedding associated with a source of the multi-channel audio comprises processing each channel of the multi-channel audio using a spatial probability model.

* * * * *